US006993399B1

(12) United States Patent
Covell et al.

(10) Patent No.: US 6,993,399 B1
(45) Date of Patent: Jan. 31, 2006

(54) ALIGNING DATA STREAMS

(75) Inventors: Michele M. Covell, Los Altos Hills, CA (US); Harold G. Sampson, Sunnyvale, CA (US)

(73) Assignee: YesVideo, Inc., Santa Clara, CA (US)

( * ) Notice: Subject to any disclaimer, the term of this patent is extended or adjusted under 35 U.S.C. 154(b) by 678 days.

(21) Appl. No.: 10/083,677

(22) Filed: Feb. 25, 2002

Related U.S. Application Data

(60) Provisional application No. 60/271,270, filed on Feb. 24, 2001, provisional application No. 60/271,914, filed on Feb. 26, 2001.

(51) Int. Cl.
*H04N 9/475* (2006.01)

(52) U.S. Cl. ........................................ 700/94; 348/515

(58) Field of Classification Search ................ 348/500, 348/515; 386/52, 66; 700/94
See application file for complete search history.

(56) References Cited

U.S. PATENT DOCUMENTS

| | | | | |
|---|---|---|---|---|
| 5,040,081 | A * | 8/1991 | McCutchen | 386/66 |
| 6,483,538 | B2 * | 11/2002 | Hu | 348/180 |
| 6,751,360 | B1 * | 6/2004 | Lu | 382/278 |

* cited by examiner

*Primary Examiner*—Brian T. Pendleton

(57) ABSTRACT

The invention aligns two wide-bandwidth, high resolution data streams, in a manner that retains the full bandwidth of the data streams, by using magnitude-only spectrograms as inputs into the cross-correlation and sampling the cross-correlation at a coarse sampling rate that is the final alignment quantization period. The invention also enables selection of stable and distinctive audio segments for cross-correlation by evaluating the energy in local audio segments and the variance in energy among nearby audio segments.

18 Claims, No Drawings

ALIGNING DATA STREAMS

This application claims benefit of U.S. Provisional 60/271,270, filed Feb. 24, 2001 which claims benefit of 60/271,914, filed Feb. 26, 2001.

BACKGROUND OF THE INVENTION

1. Field of the Invention

This invention relates to aligning data streams (e.g., sets of visual and/or audio data). The invention particularly relates to quantized alignment (i.e., alignment at a lower temporal resolution than that of the data that is used to do the alignment) of wide-bandwidth data streams. The invention also particularly relates to selecting distinctive audio segments for cross-correlation to enable alignment of data streams including audio data.

2. Related Art

There are various situations in which it is desirable to use high resolution information to provide quantized estimates of the optimal alignment between two data streams. An example of this is using audio samples from two sets of audiovisual data to estimate how many video frames (which are obtained at a relatively low rate compared to that at which audio samples are obtained) to offset one video stream relative to another for optimal alignment of the audio and, by association, the video frames and (if applicable) the associated metadata of the two sets of audiovisual data. In such case, since it does not make sense, from the video point of view, to talk about offsets other than in video frame rate increments, a situation exists in which the data that it is desired to use for alignment (the audio data) is much higher resolution than the alignment information that it is desired to estimate.

An approach could be taken of cross-correlating the two data streams at the high resolution of the data (e.g., at the resolution of audio samples) and then, after finding the highest normalized correlation location, quantizing that location to a lower resolution of the data (e.g., to a multiple of the video frame rate). This approach has the disadvantage of requiring more computation than would nominally be expected for the number of distinct alignment possibilities that are ultimately being considered.

Another approach would be to use the high resolution data (e.g., audio samples), but only sample the cross-correlation at a lower resolution (e.g., once every video frame period). This has the distinct disadvantage of undersampling the cross-correlation function relative to its Nyquist rate: since the cross-correlation function is not being sampled often enough, it is very likely that the optimal alignment will be missed and, instead, some other alignment selected that is far from the best choice. See A. V. Oppenheim, R. W. Schafer, Discrete-Time Signal Processing (Prentice Hall, 1989), for more detailed discussion of undersampled signals and aliasing.

Still another approach would be to low pass (or band pass) filter the high resolution data streams before attempting the cross-correlation. In this case, the cross-correlation function can be sampled at the lower resolution without worrying about the Nyquist rate: the low pass (or band pass) filter of the inputs into the cross-correlation function ensures that the Nyquist requirements are met. However, low pass (or band pass) filtering the input data so severely is likely to remove many of the distinctive identifying characteristics of the high resolution data streams, thus degrading the ability or the cross-correlation to produce accurate alignment. For example, if this approach is used with two audiovisual data streams, even if a "good" band is selected to pass, there are not many distinguishing features left in an audio signal that has been filtered down to a 15 Hz bandwidth 115 Hz=30 Hz/2, since sampling occurs at 30 Hz and Nyquist requires 2 samples/cycle).

Additionally, there are various situations in which it is desired to use a short segment from each of two long audio data streams to estimate an alignment between the two audio data streams and any associated data (e.g., video data, metadata). An example of this is using audio samples from two sets of audiovisual data to estimate how many frames to offset one video stream relative to another for optimal alignment of the audio and, by association, the video frames and (if applicable) the associated metadata of the two sets of audiovisual data. Since the amount of computation that is required for the cross-correlation varies as N log N, where N is the segment length that is being used in the cross-correlation, it is typically not desirable to use the full audio streams. Instead, it is desirable to select a short segment from one of the audio streams that is both stable (i.e., unlikely to "look different" after repeated digitization) and distinctive. (Stability can be an issue, for example, in applications in which a first digitization uses automatic gain control and a second digitization doesn't, so that it is necessary to be careful about picking segments with low power in the frequency bands at which the automatic gain control responds.) If these two criteria are met, a single, clear-cut correlation peak that is well localized and is well above the noise floor can be obtained.

One way to select such a short segment would be to examine the auto correlation function over local windows. This approach has the disadvantage of being computationally expensive: it requires on the order of N log N computations for each N-length local window that is considered.

SUMMARY OF THE INVENTION

According to one aspect of the invention, two wide-bandwidth, high resolution data streams are aligned, in a manner that retains the full bandwidth of the data streams, by using magnitude-only spectrograms as inputs into the cross-correlation and sampling the cross-correlation at a coarse sampling rate that is the final alignment quantization period.

According to another aspect of the invention, stable and distinctive audio segments are selected for cross-correlation by evaluating the energy in local audio segments and the variance in energy among nearby audio segments.

DETAILED DESCRIPTION OF THE INVENTION

I. Quantized Alignment of Wide-Bandwidth Data Streams

According to one aspect of the invention, wide-bandwidth, high resolution data streams can be aligned at a lower resolution in a manner that retains the full bandwidth of the data, but only samples the cross-correlation at a coarse sampling rate that is a final alignment quantization period corresponding to the lower resolution. For example, this aspect of the invention can be used to align audiovisual data streams at the resolution of the video data, using the audio data to produce the alignment.

Quantized alignment of wide-bandwidth data streams according to this aspect of the invention avoids problems with undersampling by using magnitude-only spectrograms as inputs into the cross-correlation. A magnitude-only spectrogram is computed for each of the high resolution data streams, using a spectrogram slice length (e.g., video frame size) that is appropriate for the stationarity characteristics of the high resolution data streams (i.e., that produces largely stationary slices of the high resolution data) and a spectrogram step size (e.g., video frame offset) that is appropriate for the quantization period of the final alignment (i.e., that can achieve the resolution requirements of the low-resolution alignment). If the spectrogram slices are too short, the spectrogram slices can suffer from strong local edge effects (e.g., in audio, glottal pulses). On the other hand, it is desirable for the spectrogram slices to be no longer than the desired resolution of the alignment. However, the latter consideration is less important than the former; if there is a conflict between the two, the former consideration should govern the selection of spectrogram slice length. When this aspect of the invention is used to align audiovisual data streams, the spectrogram slice length and step size can be, for example, 1/29.97 sec. (which corresponds to a common video frame rate).

Treating the spectrograms as multi-channel data vectors, one-dimensional cross-correlation can be used on these low sampling rate streams. For example, any of the standard FFT-based one-dimensional convolution routines can be used.

Quantized alignment of wide-bandwidth data streams according to this aspect of the invention reduces overall computational requirements compared to previous approaches. For example, for the first approach described in the Background section above, with the minimum-sized FFT-based cross-correlation being used for computational efficiency (i.e., allowing aliasing on the offsets that will not be examined), the computational load is 3/2*(N+L)*M*(log(N+L)+log M), where N is the maximum forward or backward offset that it is desired to consider (that is, +/−N), M is the oversampling rate of the high resolution data stream, and L*M is the number of samples over which integration will be performed to get a cross-correlation estimate. In contrast, for the invention, the computational load is L*M*log(M) for the spectrograms, plus 3/2*M*(N+L)*log(N+L) for the M-channel, low-resolution cross-correlation. The computational savings, as compared to the first approach described in the Background section above, is [3/2*M*N*log(M)]+[1/2*M*L*log(M)]. For some typical audio/video settings, M=500, N=20, and L=160. In that case, there is a 22% computational savings. The reduction in memory requirements is much larger: the size of the individual FFTs that are used are reduced by a factor of M (in a typical audio/video setting, 500), resulting in a similar reduction in fast memory requirements.

II. Selecting Distinctive Audio Segments for Cross-Correlation

According to another aspect of the invention, a conservative approach is used to select distinctive audio segments for cross-correlation, which will tend to err on the side of not finding a segment that could have been accurately used for cross-correlation and will seldom return a segment that is not reasonable for finding a good cross-correlation peak.

According to this aspect of the invention, distinctive audio segments for cross-correlation are selected using an approach that is based on the energy in a local audio segment and how the energy varies in nearby audio segments. In one implementation of this aspect of the invention, energy measures are computed using three window lengths: a short time window (e.g., 0.125 sec.) for computing local audio energy, a long time window (e.g., the whole audio stream) for computing normalizing constants, and a mid-length time window (e.g., 1 sec.) for computing the local variation in the audio energy level.

According to this aspect of the invention, segments are marked as "good segments" (i.e., segments that can be used for cross-correlation) when the audio energy level for the segment is above some minimum threshold (e.g., 0.3 times the global mean energy, $A_{var}$) and when the audio energy level in nearby segments varies by some other minimum threshold (e.g., the variance of the audio energy over the mid-length time window varies by at least 0.1 times the square of the global mean energy, $A_{var}$).

This aspect of the invention is desirably further implemented to ensure that random noise segments are not selected when the audio stream is essentially silent. This aspect of the invention can be implemented to avoid that problem by adjusting the estimate of the global mean energy, $A_{var}$, upward, whenever the estimate of the global mean energy, $A_{var}$, is less than the square of the global mean level.

In summary, if the audio stream is x[n], the global mean energy, $A_{var}$, is established according to the following equation:

$$A_{\mathrm{var}} = \mathrm{MAX}\left(\left(1/T\sum_{N=0}^{T-1} m_R\{x, N\}^2\right), 1/T\sum_{N=0}^{T-1} \upsilon_R\{x, N\}\right) \tag{1}$$

$$\text{where } m_R\{x, N\} = 1/R\sum_{n=0}^{R-1} x[n+RN] \tag{2}$$

$$\upsilon_R\{x, N\} = 1/R\sum_{n=0}^{R-1} x^2[n+RN] - m_R^2\{x, N\} \tag{3}$$

$R$ = length of the short time window $RT$ = length of the long time window $T$ = constant relating the length of the long time window to the length of the short time window The audio segments on which to cross-correlate are selected from the set of segments that satisfy the following conditions (the outer local mean and outer local variance estimates are taken using "N" as the sequence index):

$$m_S\{\upsilon_R(x, N), k\} > T_{level} A_{ver} \tag{4}$$

$$\upsilon_S\{\upsilon_R(x, N), k\} > T_{\mathrm{var}} A_{\mathrm{var}}^2 \tag{5}$$

where $RS$ = length of mid-length time window $S$ = constant relating length of the mid-length time window to length of the short time window $T_{level}$ = constant establishing threshold audio energy level for audio segment to be identified as distinctive $T_{\mathrm{var}}$ = constant establishing threshold audio energy variance for audio segment to be identified as distinctive The length R of the short time window can be established as some constant multiple (e.g., 1) of the low-resolution alignment that it is desired to achieve. The constant S can be chosen so that the length of the mid-length time window is short enough to achieve a desired computational efficiency and long enough to be effective in disambiguating multiple correlation peaks. A particular value of S can be chosen empirically in view of the above-described considerations. Unless prohibitively computationally expensive, the constant T can be chosen so that the long time window is equal to the duration of the entire set of audio data from which the audio segments are to be chosen for cross-correlation.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A method for aligning first and second sets of wide-bandwidth data, each of the first and second sets of data including first and second subsets of data aligned with respect to each other, each first subset of data having a first resolution and each second subset of data having a second resolution that is lower than the first resolution, the method comprising the steps of:

computing a magnitude-only spectrogram for each of the first subsets of data of the first and second sets of data, using a spectrogram slice length that is appropriate for the stationarity characteristics of the first subsets of data of the first and second sets of data and a spectrogram step size that is appropriate for the quantization period of the final alignment;

computing a one-dimensional cross-correlation of the magnitude-only spectrograms for the first subsets of data of the first and second sets of data; and selecting an alignment of the first subsets of data, and, consequently, the first and second sets of data, at the second resolution, based on the cross-correlation.

2. A method as in claim 1, wherein the spectrogram slice length and step size are 1/29.97 sec.

3. A method as in claim 1, wherein the step of computing a one-dimensional cross-correlation further comprises performing a FFT-based one-dimensional convolution method.

4. A method as in claim 1, wherein:

the first subset of data of the first and second sets of data comprises audio date; and the second subset of data of the first and second sets of data comprises visual data.

5. A method as in claim 4, wherein the second resolution is a video frame rate.

6. A method for selecting for cross-correlation a distinctive audio segment from a set of audio data, comprising the steps of:

computing the audio energy in a first time window corresponding to a first audio segment;

computing the audio energy in a second time window corresponding to a second audio segment that includes the first audio segment;

determining whether the audio energy in the first time window exceeds a first threshold; and determining whether the variance of audio energy in the second time window exceeds a second threshold, wherein the first audio segment is selected as a distinctive audio segment if the first and second thresholds are exceeded.

7. A method as in claim 6, wherein:

the first time window is 0.125 seconds; and the second time window is 1 second.

8. A method as in claim 6, wherein:

the first threshold is a multiple of the global mean energy; and the second threshold is a multiple of the square of the global mean energy.

9. A method as in claim 8, wherein:

the first threshold is 0.3 times the global mean energy; and the second threshold is 0.1 times the square of the global mean energy.

10. A method as in claim 8, wherein the global mean energy is calculated over the entire set of audio data.

11. A method as in claim 8, further comprising the steps of:

comparing the global mean energy to the square of the global mean energy; and increasing the value of the global mean energy if the global mean energy is less than the square of the global mean energy.

12. A method as in claim 6, wherein the duration of the first time window is a multiple of a specified granularity of alignment of the set of audio data with another set of audio data.

13. A method for aligning a first set of data representing content occurring over a period of time with a second set of data representing content occurring over a period of time, each of the first and second sets of data including audio data, comprising the steps of:

selecting a distinctive audio segment from the audio data of the first set of data, wherein the step of selecting comprises the steps of:

evaluating each of a plurality of audio segments from the audio data of the first set of data; and identifying one of the plurality of audio segments, based on the evaluation of each of the plurality of audio segments, as the distinctive audio segment; and computing croon-correlation between the distinctive audio segment from the audio data of the first set of data and the audio data of the second set of data; and aligning the first and second sets of data based on the cross-correlation.

14. A method as in claim 13, wherein the step of evaluating comprises, for each of the plurality of audio segments, evaluating the audio energy of the audio segment.

15. A method as in claim 14, wherein:

the step of evaluating the audio energy of the audio segment comprises the steps of;

computing the audio energy of the audio segment;

computing the audio energy of a surrounding audio segment that includes the audio segment;

determining whether the audio energy of the audio segment exceeds a first threshold; and determining whether the variance of audio energy in the surrounding audio segment exceeds a second threshold; and the step of identifying comprises the step of identifying as the distinctive audio segment one of the plurality of audio segments for which the first and second thresholds are exceeded.

16. A method as in claim 13, wherein each of the first and second sets of data further include video data.

17. A method as in claim 13, wherein each of the first and second sets of data further include metadata.

18. A method as in claim 13, further comprising the step of selecting a distinctive audio segment from the audio data of the second set of data, wherein the step of selecting a distinctive audio segment from the audio data of the second set of data comprises the steps of evaluating each of a plurality of audio segments from the audio data of the second set of data and identifying one of the plurality of audio segments from the audio data of the second set of data, based on the evaluation of each of the plurality of audio segments from the audio data of the second set of data, as the distinctive audio segment from the audio data of the second set of data, and wherein the step of computing cross-correlation comprises computing cross-correlation between the distinctive audio segment from the audio data of the first set of data and the distinctive audio segment from the audio data of the second set of data.

* * * * *